(12) United States Patent
Inatani et al.

(10) Patent No.: US 11,987,170 B1
(45) Date of Patent: May 21, 2024

(54) GEAR SHIFT ADJUSTING MECHANISM AND HEADLIGHT DEVICE

(71) Applicant: Mitsubishi Electric Corporation, Tokyo (JP)

(72) Inventors: Takeshi Inatani, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/279,213

(22) PCT Filed: Mar. 19, 2021

(86) PCT No.: PCT/JP2021/011371
§ 371 (c)(1),
(2) Date: Aug. 29, 2023

(87) PCT Pub. No.: WO2022/195849
PCT Pub. Date: Sep. 22, 2022

(51) Int. Cl.
*B60Q 1/08* (2006.01)
*F21S 41/63* (2018.01)

(52) U.S. Cl.
CPC .............. *B60Q 1/08* (2013.01); *F21S 41/635* (2018.01); *B60Q 2200/30* (2013.01); *B60Q 2300/112* (2013.01)

(58) Field of Classification Search
CPC ................ B60Q 1/08; B60Q 2300/112; B60Q 2200/30; F21S 41/635
See application file for complete search history.

(56) References Cited

U.S. PATENT DOCUMENTS

| | | | | |
|---|---|---|---|---|
| 5,099,400 A | * | 3/1992 | Lee ......................... | B60Q 1/122 362/53 |
| 2011/0286228 A1 | * | 11/2011 | Zanma ................... | B60Q 1/0683 362/516 |
| 2023/0048664 A1 | * | 2/2023 | Fladhammer ........ | B60Q 1/0686 |

FOREIGN PATENT DOCUMENTS

| | | |
|---|---|---|
| JP | H07-113453 A | 5/1995 |
| JP | 2534076 B2 | 9/1996 |
| JP | 2007-333096 A | 12/2007 |
| JP | 5700818 B2 | 4/2015 |

OTHER PUBLICATIONS

International Search Report and Written Opinion dated May 18, 2021, received for PCT Application PCT/JP2021/011371, filed on Mar. 19, 2021, 8 pages including English Translation.

* cited by examiner

*Primary Examiner* — Anne M Hines
(74) *Attorney, Agent, or Firm* — XSENSUS LLP

(57) ABSTRACT

A gear shift adjusting mechanism includes: an adjustment unit including a first slider; an adjustment target module including a second slider; and a switch unit including a first rotation shaft and a link member supported rotatably with respect to a fixing member about the first rotation shaft. The link member includes a first engaged part that is engaged with a first engaging part of the first slider and a second engaged part that is engaged with a second engaging part of the second slider. The switch unit moves at least one of the first rotation shaft, the first engaging part, or the second engaging part so that at least one of a first distance between the first rotation shaft and the first engaging part or a second distance between the first rotation shaft and the second engaging part is changed.

16 Claims, 15 Drawing Sheets

GEAR SHIFT ADJUSTING MECHANISM AND HEADLIGHT DEVICE

CROSS-REFERENCE TO RELATED APPLICATION

The present application is based on PCT filing PCT/JP2021/011371, filed Mar. 19, 2021, the entire contents of which are incorporated herein by reference.

TECHNICAL FIELD

The present disclosure relates to a gear shift adjusting mechanism and a headlight device.

BACKGROUND ART

There is a known structure of a headlight device including an adjusting mechanism for adjusting an orientation of an optical axis of an optical module as an adjustment target module rotatably supported by a bracket. The adjusting mechanism includes three support mechanisms: a rotation support mechanism that rotatably supports the optical module; a top-bottom translation support mechanism that supports the optical module such that the optical module can translate in the top-bottom direction; and a left-right translation support mechanism that supports the optical module such that the optical module can translate in the left-right direction (i.e., horizontal direction), so that the optical module is thereby locked at three points. The amount of movement in each of the support mechanisms is adjusted so that an orientation of the optical axis is adjusted in the top-bottom direction and in the left-right direction. See, for example, Patent Reference 1.

An adjusting mechanism of Patent Reference 1 holds a bracket supporting an optical module in a housing of a headlight device by using a mechanism combining a spherical joint (pivot shaft), an aiming screw, and an aiming nut, and a mechanism combining another aiming screw and another aiming nut. In Patent Reference 1, the optical module is supported to be rotatable about a rotation shaft coupled to the bracket. An orientation of the optical module of Patent Reference 1 in the top-bottom direction is adjusted by linear motion of a driving shaft of a motor connected to the optical axis. An orientation of the optical axis in the left-right direction is manually adjusted by using the pair of the aiming screw and the aiming nut.

PRIOR ART REFERENCE

Patent Reference
Patent Reference 1: Japanese Patent No. 5700818

SUMMARY OF THE INVENTION

Problem to be Solved by the Invention

Optical axis adjustment of an optical module preferably can be employed for both high-accuracy feed operation enabling fine adjustment with high resolution and high-speed feed operation enabling instantaneous correction of a dynamic angle change. However, the feed accuracy of a driving shaft (hereinafter referred to as a "rotation output shaft") of a motor for achieving high resolution and the feed speed of the driving shaft for instantaneously correcting a dynamic angle change of the optical module have a contradictory relationship. That is, the resolution and the feed speed for an orientation of the optical axis of the optical module are uniquely determined based on a decomposition rate of a drive system coupled to the motor. Therefore, there arises a problem of a failure in switching the resolution during operation.

It is therefore an object of the present disclosure to provide a gear shift adjusting mechanism and a headlight device that enable switching of resolution of the amount of movement of an adjustment target module.

Means of Solving the Problem

A gear shift adjusting mechanism according to an aspect of the present disclosure includes: an adjustment unit supported by a fixing member and including a first slider movable along a first slide shaft; an adjustment target module supported by the fixing member and including a second slider movable along a second slide shaft, the second slide shaft being parallel to the first slide shaft; and a switch unit supported by the fixing member and including a first rotation shaft and a link member, the first rotation shaft being perpendicular to the first Slide shaft and perpendicular to a line connecting the first slide shaft and the second slide shaft to each other, the link member being supported rotatably with respect to the fixing member about the first rotation shaft, wherein the first slider includes a first engaging part, the second slider includes a second engaging part, the link member includes a first engaged part that is engaged with the first engaging part, and a second engaged part that is engaged with the second engaging part, and the switch unit moves a movable unit, the movable unit that is at least one of the first rotation shaft, the first engaging part, or the second engaging part so that at least one of a first distance between the first rotation shaft and the first engaging part or a second distance between the first rotation shaft and the second engaging part is changed.

Effects of the Invention

According to the present disclosure, it is possible to provide a gear shift adjusting mechanism and a headlight device that enable switching of resolution of the amount of movement of an adjustment target module.

MODE FOR CARRYING OUT THE INVENTION

Figure 1:
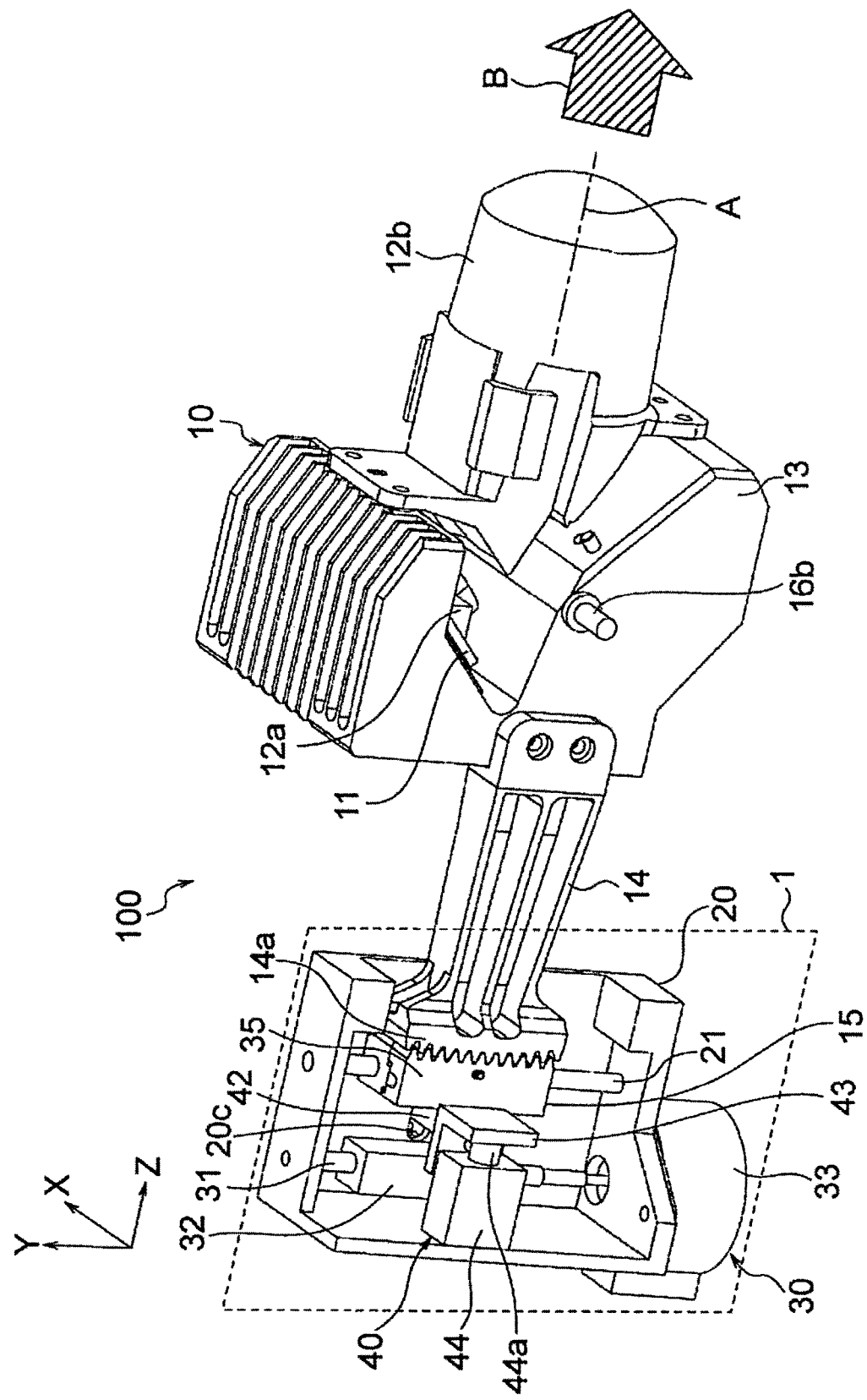
FIG. 1 is a perspective view schematically illustrating a structure of a headlight device according to a first embodiment.

Gear shift adjusting mechanisms and headlight devices according to embodiments of the present disclosure will be described with reference to the drawings. The following embodiments are merely examples, and various changes may be made within the scope of present disclosure.

The gear shift adjusting mechanism according to each embodiment is an adjusting mechanism that adjusts an emission direction of light emitted from an optical module of a headlight device. The headlight device is an illumination device. The headlight device is, for example, a headlight device for a vehicle. The vehicle is, for example, a four-wheeled vehicle. The gear shift adjusting mechanism according to each embodiment is not limited to a configuration included in a headlight device for a vehicle, and may be included in an illumination device or a display device enabling lighting such as road surface lighting or guide lighting. The gear shift adjusting mechanism according to each embodiment is also applicable as a rotation mechanism that rotates an optical module with high accuracy by using straight-traveling motion by a straight-traveling mechanism. In particular, the gear shift adjusting mechanism according to each embodiment is preferable as a rotation mechanism that rotates a small-size optical module.

In the figures, coordinate axes of an XYZ orthogonal coordinate system are shown to facilitate understanding of the description. An X axis is a left-right direction when seen in a light emission direction of the headlight device. A +X-axis direction is a leftward direction and a −X-axis direction is a rightward direction when seen in the light emission direction of the headlight device. A Y axis is a top-bottom direction of the headlight device. A +Y-axis direction is an upward direction, and a −Y-axis direction is a downward direction. A Z axis is a front-rear direction of the headlight device. A +Z-axis direction is a forward direction, and a −Z-axis direction is a rearward direction. The +Z-axis direction is a light emission direction.

In the following description, optical axis adjustment around the X axis of the headlight device refers to adjustment of an orientation of the optical axis of the headlight device in the top-bottom direction.

The optical axis adjustment around the X axis of the headlight device is performed to modify an optical axis shift caused by a tilt of a vehicle body of a vehicle in attaching the headlight device to the vehicle body or during traveling.

In a case where the optical axis tilts forward obliquely upward or forward obliquely downward by rotation of the optical module of the headlight device about the X axis in attaching the headlight device to the vehicle body, optimum light distribution (hereinafter also referred to as a "light distribution pattern") by the headlight device cannot be obtained, disadvantageously. In this case, light emitted from the optical module might provide dazzling to a driver of an oncoming car. The "dazzling" refers to making a person unable to see properly. The "dazzling" herein refers to a phenomenon in which light emitted from the optical module enters the eyes of a driver of an oncoming car and hinders driving. In view of this, in the following embodiments, a gear shift adjusting mechanism performs optical axis adjustment to correct a tilt of an optical axis of an optical module around the X axis with respect to a vehicle body.

In a case where a person rides on a rear seat of a vehicle, a vehicle body tilts forward obliquely upward. In a case where a rear seat or a rear trunk, for example, is loaded with baggage, the vehicle body also tilts forward obliquely upward. When the vehicle accelerates, the vehicle body tilts forward obliquely upward, whereas when the vehicle body decelerates, the vehicle body tilts forward obliquely downward. The "tilt" herein refers to a tilt in a direction in which the vehicle body rotates about axes of wheels of the vehicle. In such a case where the vehicle body tilts forward obliquely upward or forward obliquely downward, the gear shift adjusting mechanism performs optical axis adjustment. A control circuit (not shown) as a control unit for controlling operation of the gear shift adjusting mechanism is attached to, for example, the vehicle body. The control circuit can cause the gear shift adjusting mechanism to automatically perform optical axis adjustment of the optical module based on a detection result of a tilt sensor for detecting a tilt of the vehicle body. The control circuit can also cause the gear shift adjusting mechanism to perform optical axis adjustment of the optical module based on a signal output from a user operation unit operated by a user, such as a switch for controlling operation of the gear shift adjusting mechanism.

First Embodiment

<Configuration of Headlight Device>

Figure 2:
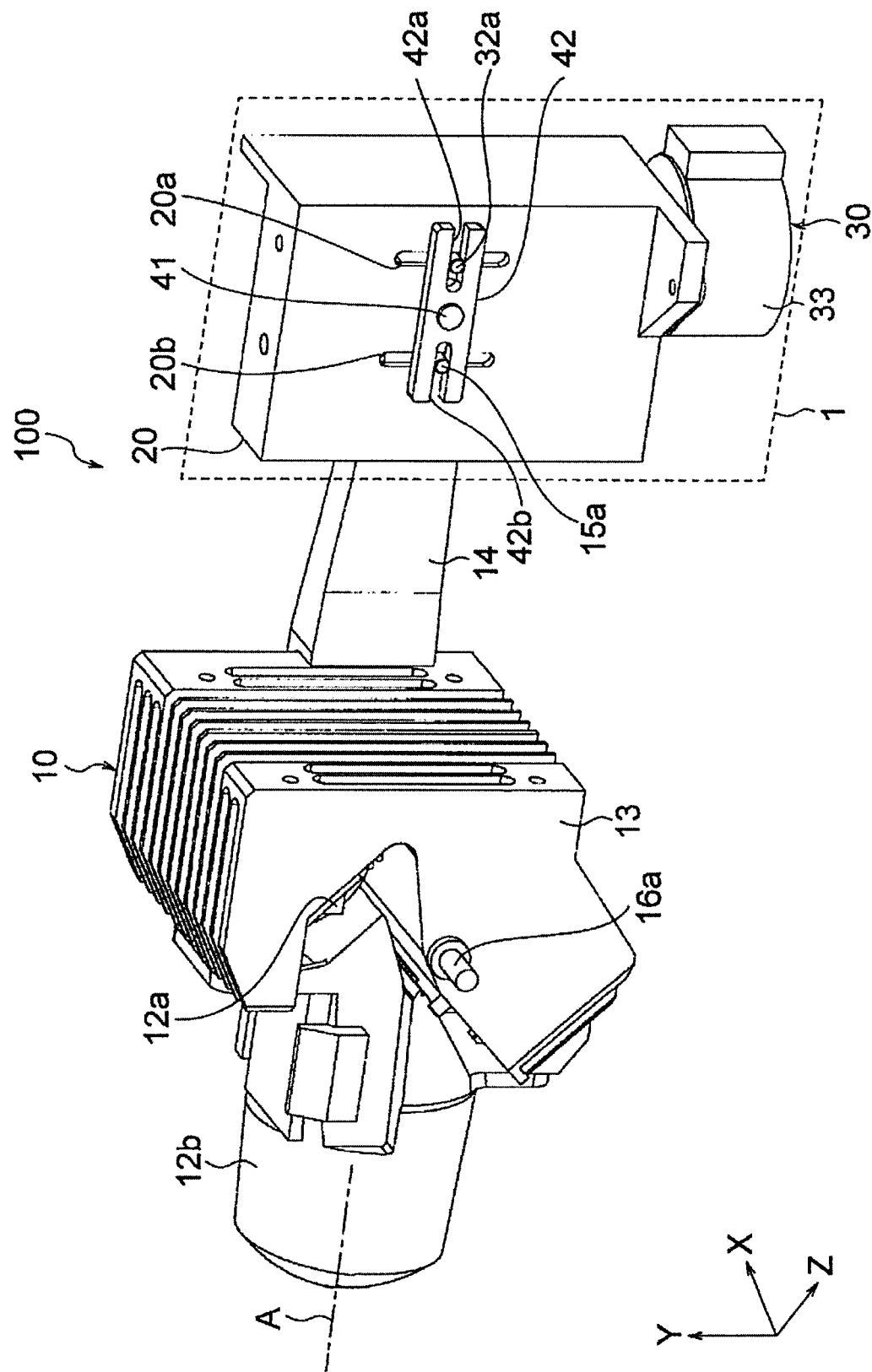
FIG. 2 is a perspective view of the structure of the headlight device according to the first embodiment when seen from an angle different from FIG. 1.
Figure 3:
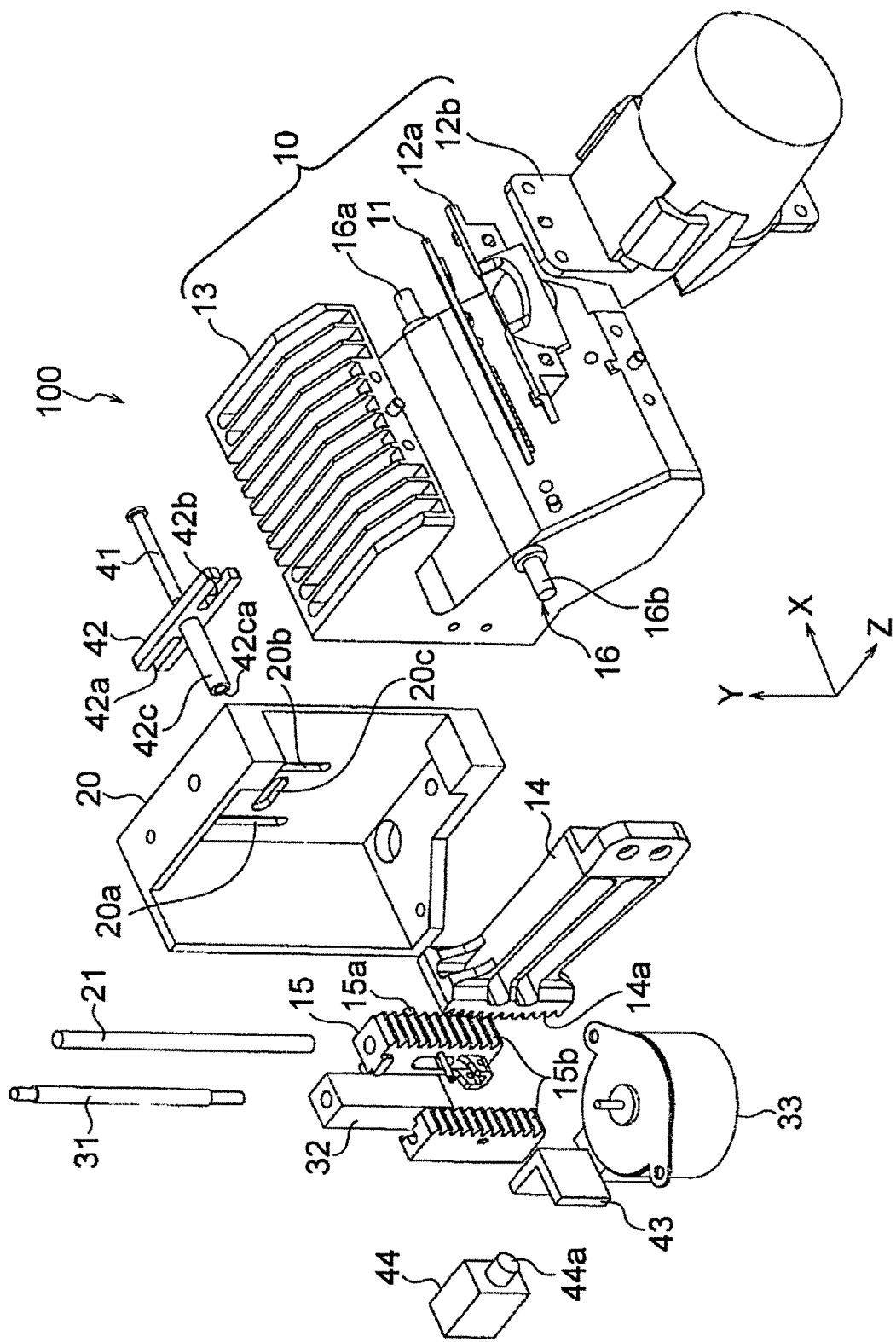
FIG. 3 is a disassembled perspective view schematically illustrating the structure of the headlight device according to the first embodiment.
Figure 4:
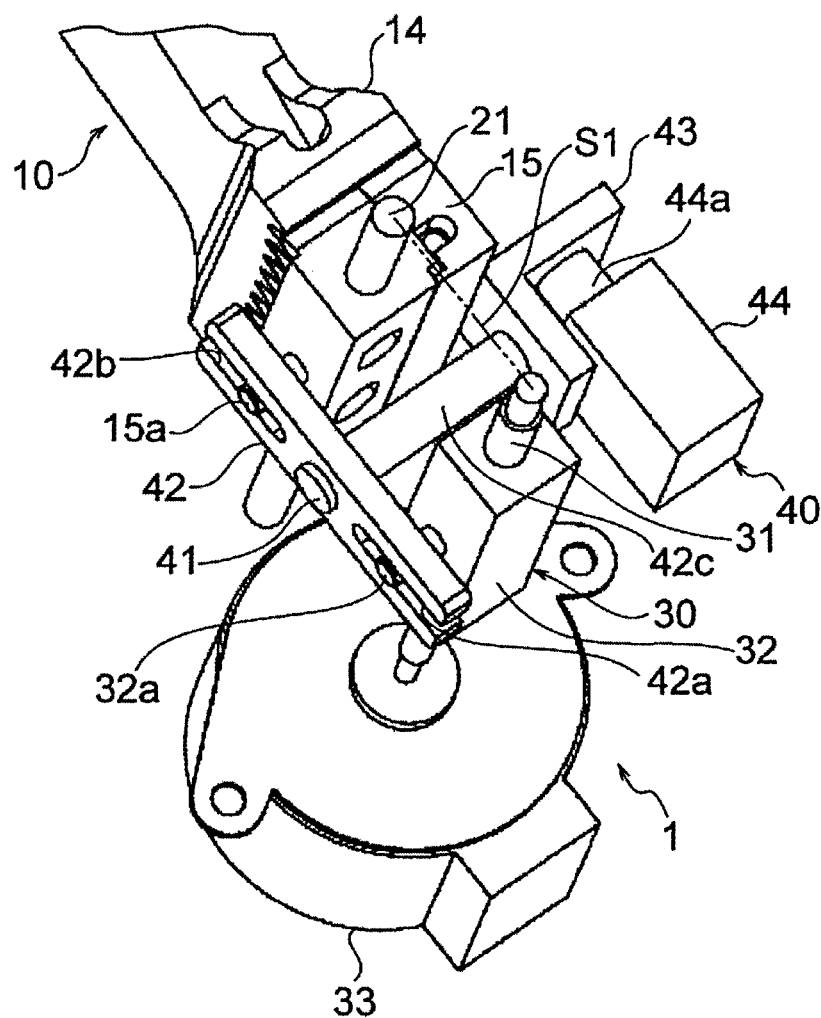
FIG. 4 is a perspective view schematically illustrating a part of the structure of the headlight device according to the first embodiment.

FIG. 1 is a perspective view schematically illustrating a structure of a headlight device 100 according to a first embodiment. FIG. 2 is a perspective view of the structure of the headlight device 100 according to the first embodiment when seen from an angle different from FIG. 1. FIG. 3 is a disassembled perspective view schematically illustrating the structure of the headlight device 100 according to the first embodiment. FIG. 4 is a perspective view schematically illustrating a part of the structure of the headlight device 100 according to the first embodiment. As illustrated in FIGS. 1 through 4, the headlight device 100 includes a gear shift adjusting mechanism 1 and an optical module 10.

The optical module 10 includes, for example, a light source 11, optical members 12a and 12b, a holding member 13, and a coupling member 14. The light source 11, the optical members 12a and 12b, and the coupling member 14 are attached to the holding member 13. The structure of the optical module 10 is not limited to the illustrated structure.

The light source 11 emits light. The light source 11 includes, for example, a solid light source. The light source 11 is held by the holding member 13. The optical members 12a and 12b transmit and reflect light emitted from the light source 11 and project the transmitted or reflected light forward (i.e., approximately in the +Z-axis direction). The optical members 12a and 12b change a light distribution patter of light emitted from the light source 11, and project the light as light B illustrated in FIG. 1. The optical member 12b includes, for example, a projector lens. In the following description, the optical axis of the optical member 12b will be referred to as an "optical axis A."

The holding member 13 supports the light source 11 and the optical members 12a and 12b. The holding member 13 has a function as a heat dissipator, for example. Accordingly, heat generated by the light source 11 is effectively diffused, and thus, an excessive temperature rise of the light source 11 is suppressed.

The holding member 13 includes second rotation shafts 16a and 16b disposed on end surfaces of the holding member 13 in the left-right direction (i.e., ±X-axis direction). The second rotation shaft 16b projecting in the −X-axis direction is coaxial with the second rotation shaft 16a projecting in the +X-axis direction. That is, the coaxial second rotation shafts 16a and 16b project in opposite directions. Although not shown, the second rotation shafts 16a and 16b are rotatably supported by a fixing member 20 and are rotatable about the X axis. In the following description, when the second rotation shaft 16a and the second rotation shaft 16b do not need to be distinguished from each other, the second rotation shaft 16a and the second rotation shaft 16b will be collectively referred to as "second rotation shafts 16."

The coupling member 14 is disposed in the rear side (i.e., rear surface) of the holding member 13 in the front-rear direction (i.e., ±Z-axis direction). An engaging part 14a constituted by a pinion, for example, is disposed at a rear end of the coupling member 14. The engaging part 14a is engaged with an engaged part 15b of a second slider 15 described later.

The gear shift adjusting mechanism 1 includes the fixing member 20, an adjustment unit 30, an adjustment target module 35, and a switch unit 40. The fixing member 20 is omitted in FIG. 4.

The fixing member 20 supports the adjustment unit 30, the adjustment target module 35, and the switch unit 40.

The adjustment unit 30 includes a first slide shaft 31, a first slider 32, and a first driving unit 33. The first slide shaft 31 is, for example, a feed screw. The first slide shaft 31, the first slider 32, and the first driving unit 33 constitute a straight-traveling mechanism that causes the first slider 32 to move straight in the Y-axis direction.

The first slide shaft 31 is parallel to the second slide shaft 21 described later. The first slide shaft 31 extends in the Y-axis direction. The first slide shaft 31 is rotatably supported by the fixing member 20 to be rotatable about the Y axis. The first slider 32 is movable along the first slide shaft 31. The first driving unit 33 generates a rotation driving force as a first driving force for moving the first slider 32. A rotation output shaft of the first driving unit 33 is coupled to the first slide shaft 31 so that the rotation driving force is transferred to the first slide shaft 31. A body of the first driving unit 33 is fixed to the fixing member 20. The central part of the first slider 32 has a threaded portion (not shown). The threaded portion of the first slider 32 is engaged with the first slide shaft 31 so that the first slider 32 can translate in the ±Y-axis directions with respect to rotation of the first slide shaft 31 about the Y axis.

The first slider 32 has a first projection 32a as a first engaging part. The first projection 32a is disposed on an end surface of the first slider 32 in the +X-axis direction. The first projection 32a is engaged with a first slide guide groove 20a disposed in the fixing member 20 and extending in the Y-axis direction. The engagement of the first projection 32a with the first slide guide groove 20a restricts rotation of the first slider 32 about the first slide shaft 31.

The adjustment target module 35 includes a second slide shaft 21 and a second slider 15. The second slide shaft 21 is parallel to the first slide shaft 31. The second slide shaft 21 extends in the Y-axis direction. The second slide shaft 21 is supported by the fixing member 20.

The second slider 15 is rotatably supported by the second slide shaft 21 to be movable in the Y-axis direction. In other words, the second slider 15 is movable along the second slide shaft 21. The second slider 15 includes a second projection 15a as a second engaging part. The second projection 15a projects in the +X-axis direction from an end surface of the second slider 15 in the +X-axis direction. The second projection 15a is engaged with a second slide guide groove 20b disposed in the fixing member 20 and extending in the Y-axis direction. The engagement of the second projection 15a with the second slide guide groove 20b restricts rotation of the second slider 15 with the second slide shaft 21.

The second slider 15 further includes an engaged part 15b. The engaged part 15b is disposed at a position opposed to the engaging part 14a of the coupling member 14 described above in the Z-axis direction. The engaged part 15b is, for example, a rack. In this manner, in the first embodiment, the engaged part 15b and the engaging part 14a are engaged with each other by a rack and pinion.

The switch unit 40 includes a first rotation shaft 41, a link member 42, a coupling lever 43, and a second driving unit 44.

The second driving unit 44 is held by the fixing member 20. One end of the second driving unit 44 is fixed to the fixing member 20. The other end of the second driving unit 44 includes a driving lever 44a movable in the Z-axis direction. The second driving unit 44 generates a second driving force for driving the first rotation shaft 41. In the first embodiment, the second driving unit 44 moves the first rotation shaft 41 in a direction orthogonal to the first rotation shaft 41, the first slide shaft 31, and the second slide shaft 21, for example. The second driving unit 44 is, for example, an actuator such as a solenoid. The coupling lever 43 is fixed to a front end of the driving lever 44a.

Figure 5:
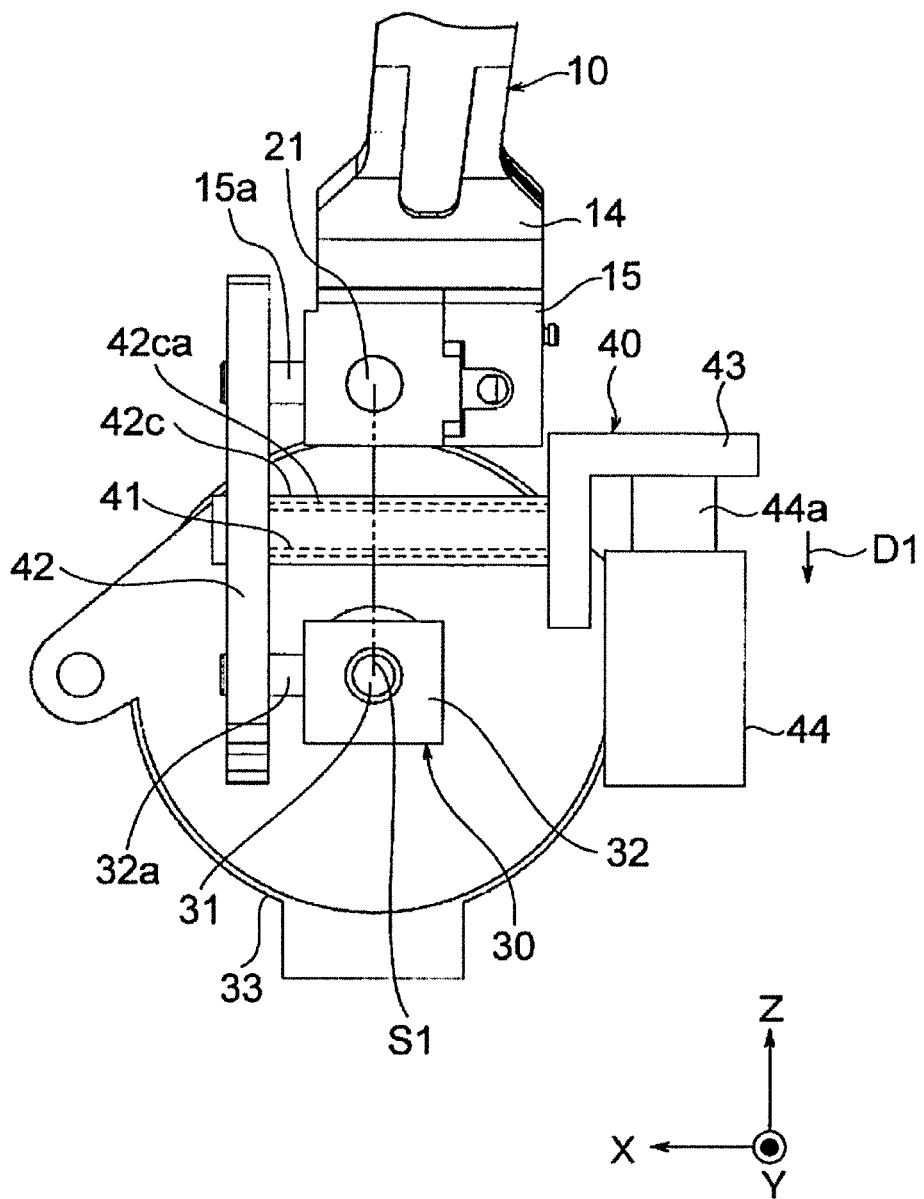
FIG. 5 is a plan view schematically illustrating a part of the structure of the headlight device according to the first embodiment.

FIG. 5 is a plan view schematically illustrating a part of the structure of the headlight device 100 according to the first embodiment. As illustrated in FIGS. 1 and 5, the coupling lever 43 includes a fixed portion 43a fixed to the driving lever 44a and another fixed portion 43b fixed to a bearing portion 42c of the link member 42. The fixed portion 43a extends in the X-axis direction. The fixed portion 43b extends in the Z-axis direction from an end of the fixed portion 43a in the +X-axis direction. Accordingly, in the first embodiment, the coupling lever 43 has an L shape, for example. The bearing portion 42c of the link member 42 has an insertion hole 42ca in which the first rotation shaft 41 is inserted. Accordingly, the bearing portion 42c is rotatably supported by the first rotation shaft 41 extending in the X-axis direction and is rotatable about the X axis. The bearing portion 42c is engaged with a third slide guide groove 20c disposed in the fixing member 20 and extending in the Z-axis direction (see FIG. 1). Accordingly, the link member 42 is supported to be movable in the Z-axis direction.

The first rotation shaft 41 is orthogonal to a line S1 orthogonal to the first slide shaft 31 and connecting the first slide shaft 31 and the second slide shaft 21. When seen in the direction in which the first rotation shaft 41 extends (hereinafter referred to as an "axial direction"), the first rotation shaft 41, the first projection 32a, and the second projection 15a are located on the same straight line (e.g., straight line S2 in FIG. 7 described later). The link member 42 is supported by the fixing member 20 to be rotatable about the first rotation shaft 41.

As illustrated in FIGS. 2 through 4, the link member 42 includes a first cam groove 42a as a first engaged part to be engaged with the first projection 32a, and a second cam groove 42b as a second engaged part to be engaged with the second projection 15a. The first cam groove 42a is disposed opposite to the second cam groove 42b with the first rotation shaft 41 in between. Each of the first cam groove 42a and the second cam groove 42b is a long groove elongated in a direction (i.e., Z-axis direction) in which a straight line connecting the first projection 32a and the second projection 15a (e.g., straight line S2 in FIG. 7 described later) extends. The first cam groove 42a and the second cam groove 42b extend in a direction parallel to this straight line. When seen in the axial direction, each of the first cam groove 42a and the second cam groove 42b has a U shape, for example. A center line of each of the first cam groove 42a and the second cam groove 42b passes through a center of the first rotation shaft 41 (i.e., shaft center $C_1$ shown in FIG. 7 described later), and the center line of the first cam groove 42a and the center line of the second cam groove 42b are located on the same straight line.

<Operation of Headlight Device>

Figure 6:
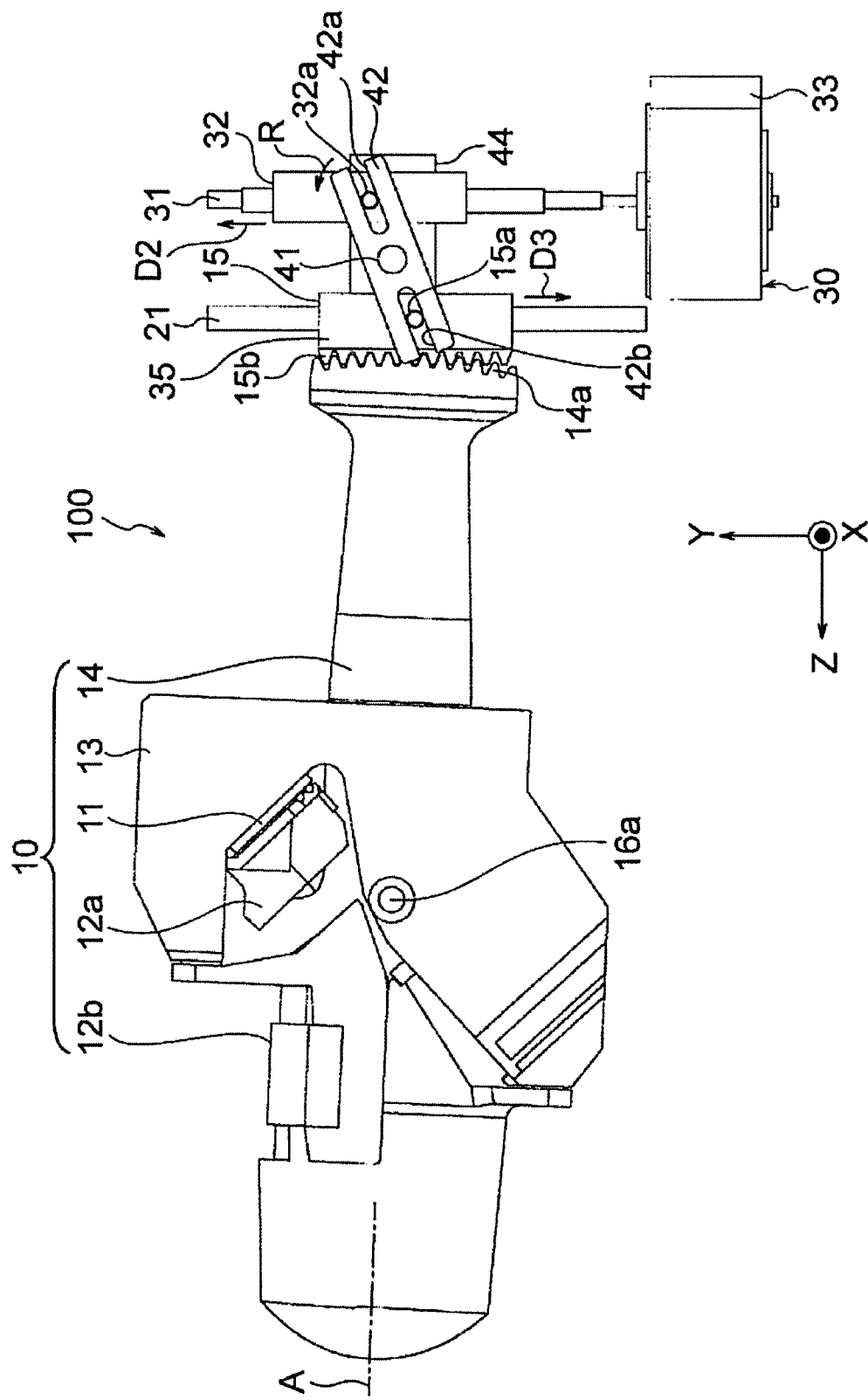
FIG. 6 is a side view illustrating the structure of the headlight device when a first driving unit illustrated in FIGS. 1 through 5 is driven.

FIG. 6 is a side view illustrating the structure of the headlight device 100 when the first driving unit 33 illustrated in FIGS. 1 through 5 is driven. FIG. 6 does not show the fixing member 20. As described above, the first slide shaft 31 rotates about the Y axis by driving the first driving unit 33. At this time, the first slider 32 moves in the +Y-axis direction (i.e., direction indicated by arrow D2 in FIG. 6) so that the first projection 32a of the first slider 32 also moves in the +Y-axis direction along the first slide guide groove 20a. Accordingly, the link member 42 including the first cam groove 42a with which the first projection 32a engages rotates about the first rotation shaft 41 (i.e., about the X axis) counterclockwise (i.e., in the direction of arrow R shown in FIG. 6).

With the counterclockwise rotation of the link member 42, the second cam groove 42b of the link member 42 also rotates about the first rotation shaft 41. At this time, the second slider 15 including the second projection 15a engaged with the second cam groove 42b moves in the −Y-axis direction (i.e., in the direction of arrow D3 in FIG. 6) along the second slide guide groove 20b. Accordingly, the engaging part 14a of the coupling member 14 engaged with the engaged part 15b of the second slider 15 is driven in the −Y-axis direction that is the same direction as the direction in which the second slider 15 moves. With this operation of the engaging part 14a, the optical module 10 is rotationally driven about the second rotation shaft 16 through the coupling member 14.

In the manner described above, in the case where the first slider 32 moves in the +Y-axis direction that is the upward direction of the headlight device 100, the second slider 15 moves in the −Y-axis direction. The optical module 10 rotates clockwise about the X axis using the second rotation shaft 16 as a rotation center. At this time, the optical axis A of the optical module 10 tilts forward obliquely upward.

Although not shown, in a case where the first slider 32 moves in the −Y-axis direction that is the downward direction of the headlight device 100, the second slider 15 moves in the +Y-axis direction. The optical module 10 rotates counterclockwise about the X axis using the second rotation shaft 16 as a rotation center. At this time, the optical axis A of the optical module 10 tilts forward obliquely downward.

Figure 7:
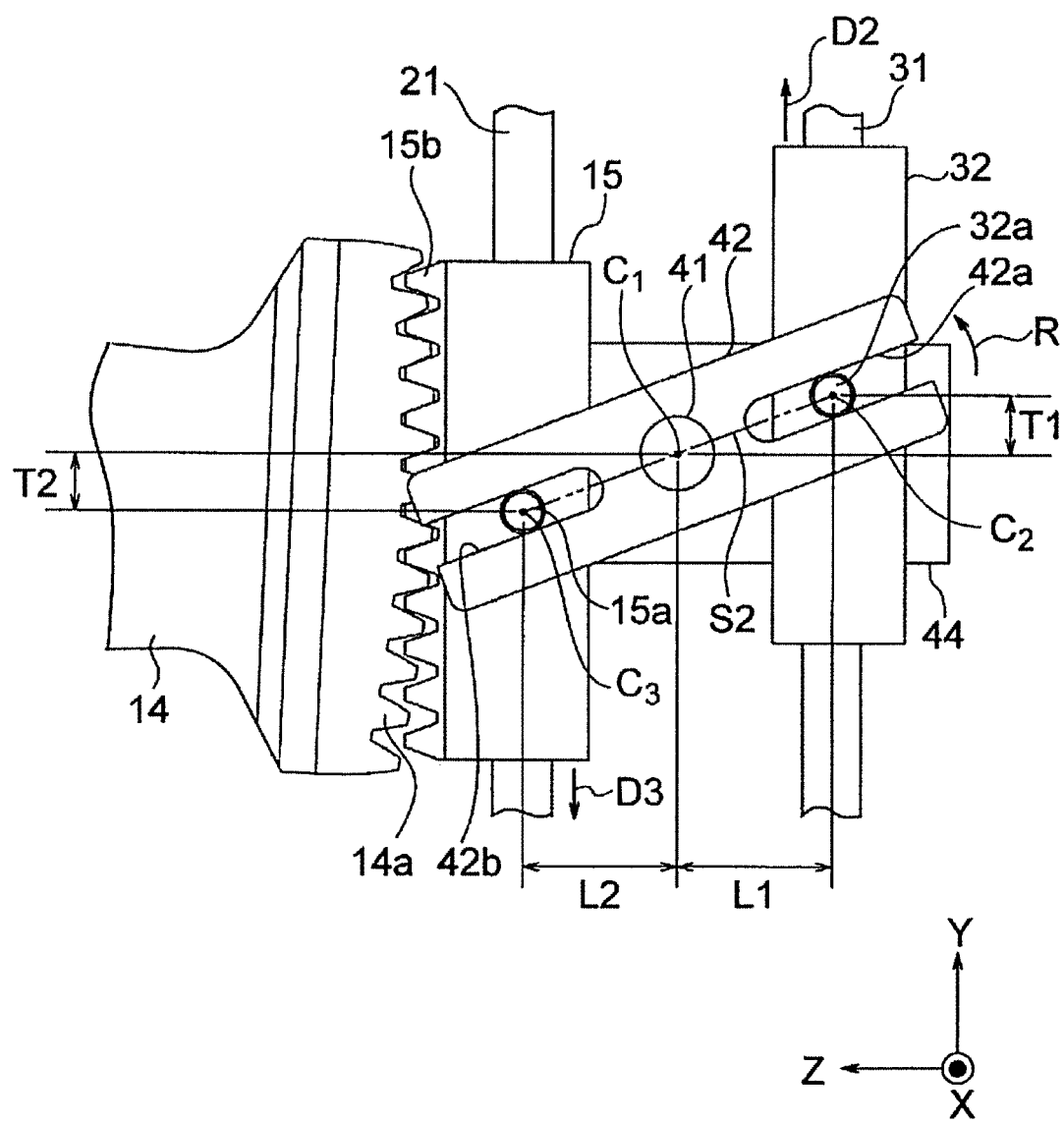
FIG. 7 is an enlarged side view illustrating a structure around a link member illustrated in FIG. 6.

FIG. 7 is an enlarged side view illustrating a structure around the link member 42 illustrated in FIG. 6. In FIG. 7, suppose the amount of movement of the first slider 32 in the Y-axis direction (hereinafter also referred to as a "unit movement amount") is T1, and the amount of movement of the second slider 15 in the Y-axis direction is T2. In FIG. 7, suppose a first distance between a shaft center $C_1$ of the first rotation shaft 41 and a center $C_2$ of the first projection 32a in the Z-axis direction is L1, and a second distance between the shaft center $C_1$ and a center $C_3$ of the second projection 15a in the Z-axis direction is L2. A ratio L2/L1 of the second distance L2 to the first distance L1 is equal to a ratio T2/T1 of the amount of movement T2 to the amount of movement T1 (hereinafter also referred to as a "driving deceleration ratio"). That is, the ratio L2/L1 and the driving deceleration ratio T2/T1 satisfy Equation (1):

$$L2/L1 = T2/T1 \tag{1}$$

Since the ratio L2/L1 and the driving deceleration ratio T2/T1 satisfy Equation (1), for example, if L1=L2, T1=T2. If L1<L2, T1<T2 is established, and if L1>L2, T1>T2 is established. Thus, the driving deceleration ratio T2/T1 can be adjusted by changing the ratio L2/L1. In the first embodiment, the second driving unit 44 of the switch unit 40 moves the first rotation shaft 41 as a movable unit so that at least one of the first distance L1 or the second distance L2 is changed.

Figure 8:
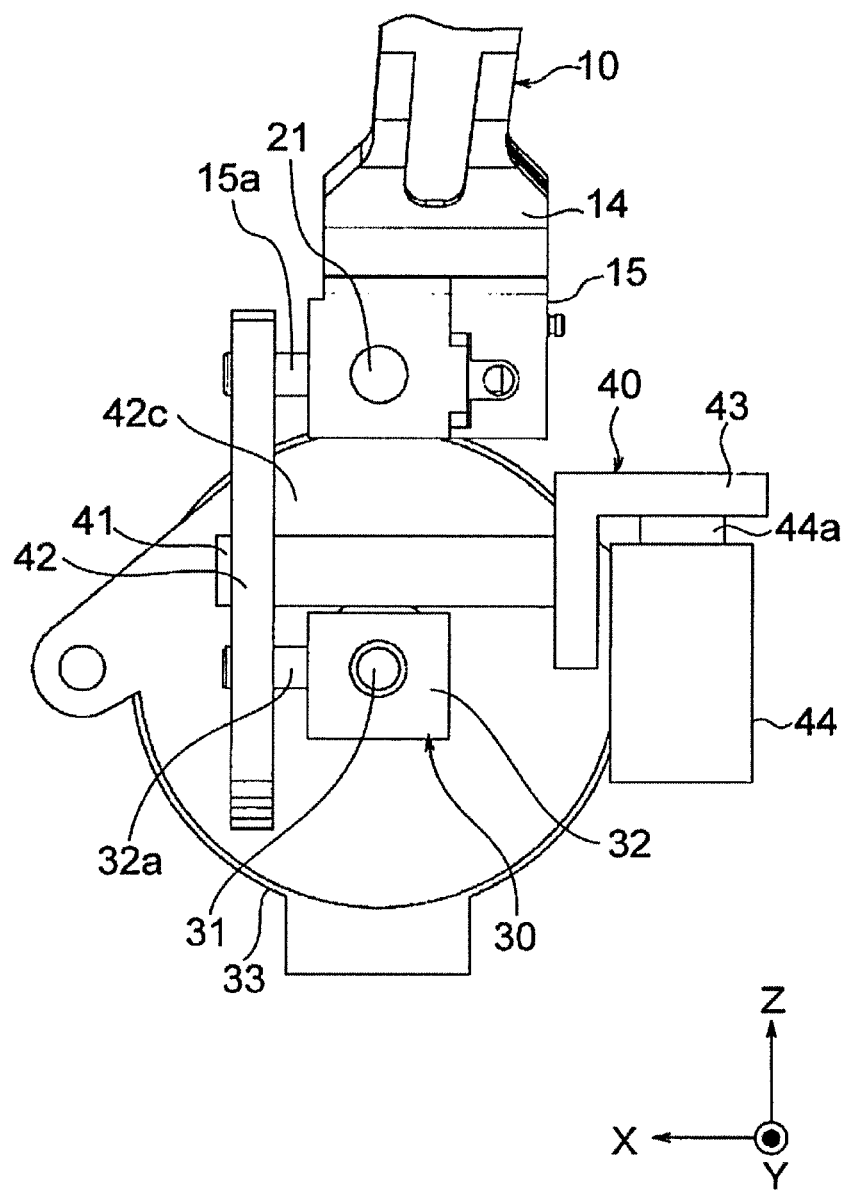
FIG. 8 is a plan view illustrating a part of the structure of the headlight device when a second driving unit illustrated in FIGS. 1 through 5 is driven.
Figure 9:
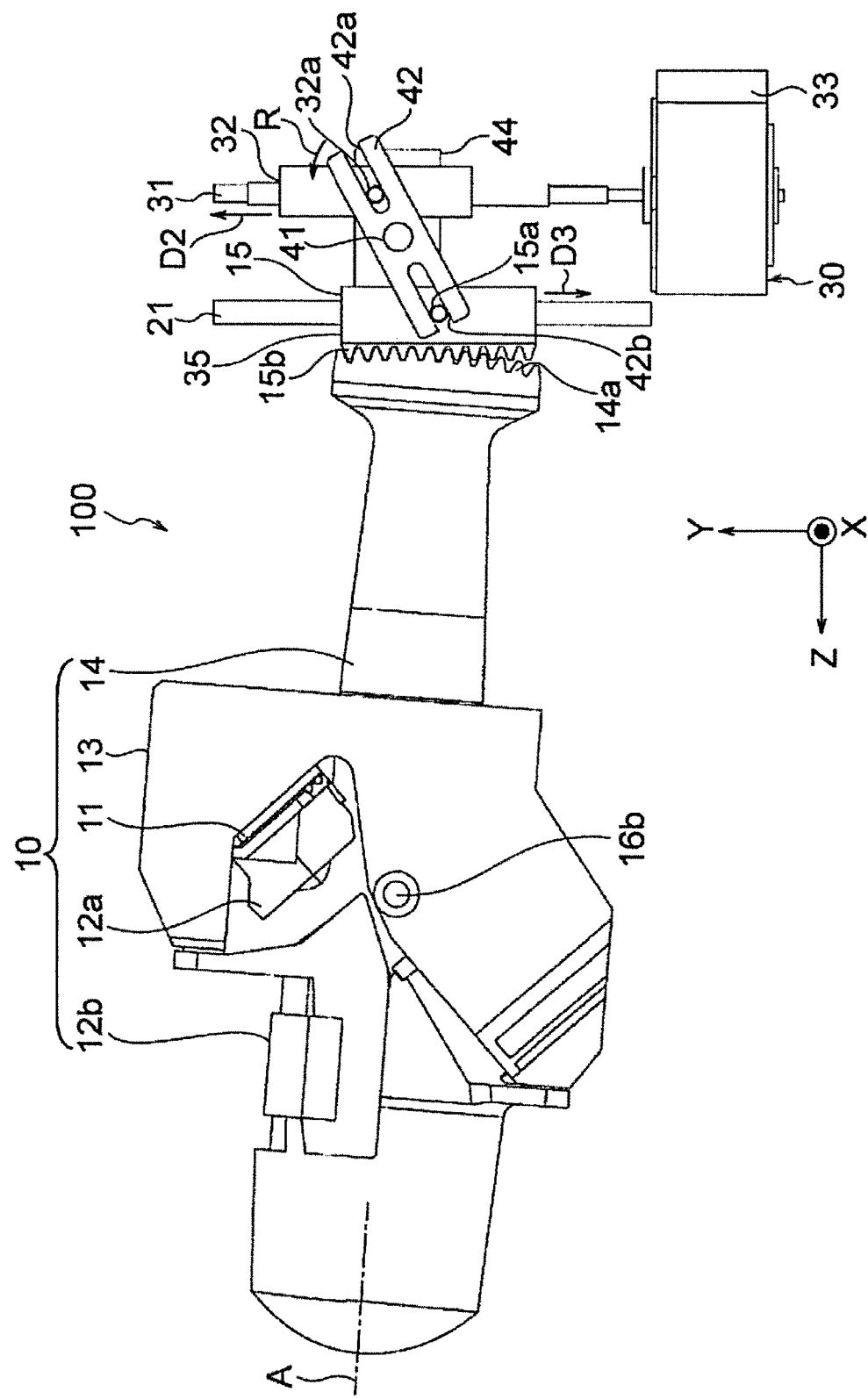
FIG. 9 is a side view illustrating the structure of the headlight device when the second driving unit illustrated in FIGS. 1 through 5 is driven.
Figure 10:
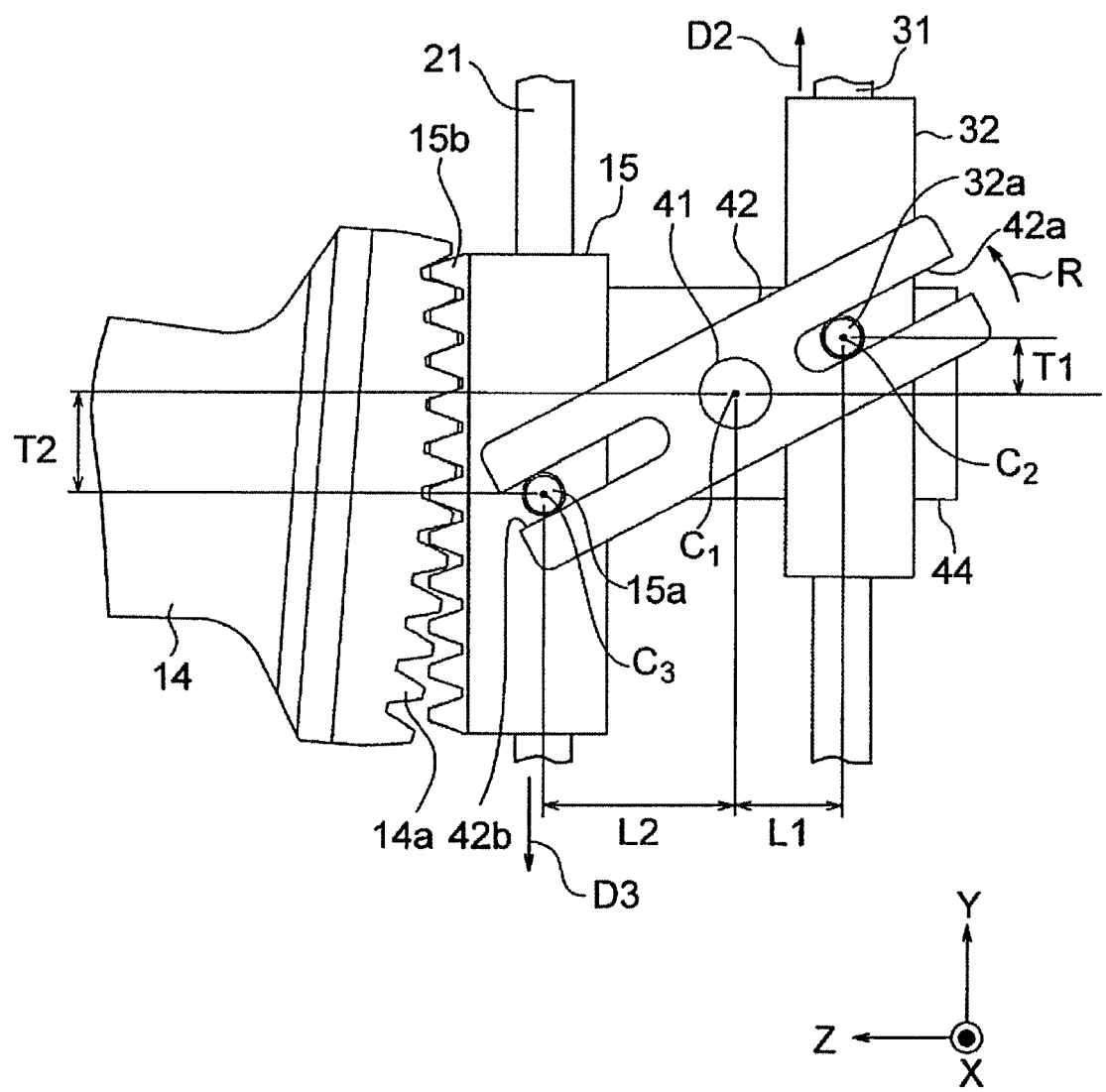
FIG. 10 is an enlarged side view illustrating a structure around the link member illustrated in FIG. 9.

With reference to FIGS. 8 through 10, an operation of adjusting the amount of movement T2 of the second slider 15 in the Y-axis direction to the unit movement amount T1 of the first slider 32 in the Y-axis direction by driving the second driving unit 44 (hereinafter also referred to as "adjustment operation") in the headlight device 100 will now be described. FIG. 8 is a plan view illustrating a part of the structure of the headlight device 100 when the second driving unit 44 illustrated in FIGS. 1 through 5 is driven. FIG. 9 is a side view illustrating the configuration of the headlight device 100 when the second driving unit 44 illustrated in FIGS. 1 through 5 is driven.

In performing adjustment operation, the driving lever 44a illustrated in FIG. 5 moves in the −Z-axis direction (i.e., direction of arrow D1 shown in FIG. 5) by driving the second driving unit 44. Accordingly, the coupling lever 43, the first rotation shaft 41, and the link member 42 fixed to the driving lever 44a also move in the −Z-axis direction. At this time, in a state where the first driving unit 33 does not move and the first projection 32a disposed in the first slider 32 is stopped, the link member 42 rotates counterclockwise (in the direction of arrow R shown in FIG. 9) about the X axis using the first projection 32a as a center while moving in the −Z-axis direction, as illustrated in FIG. 9. With the counterclockwise rotation of the link member 42, the second projection 15a engaged with the second cam groove 42b disposed in the link member 42 moves in the −Y-axis direction (i.e., direction of arrow D3 in FIG. 9) along the second slide guide groove 20b.

FIG. 10 is an enlarged side view illustrating a structure around the link member 42 illustrated in FIG. 9. As illustrated in FIG. 10, by performing adjustment operation, when the second projection 15a moves in the −Y-axis direction (i.e., direction of arrow D3), the second distance L2 becomes longer than the first distance L1. Here, as indicated by Equation (1) described above, the ratio L2/L1 is equal to the driving deceleration ratio T2/T1. Thus, when the second distance L2 becomes longer than the first distance L1, the amount of movement T2 of the second slider 15 in the Y-axis direction increases to be larger than the amount of movement T1 of the first slider 32 in the Y-axis direction.

Accordingly, an orientation of the optical axis A of the optical module 10 (i.e., rotation angle) can be adjusted at high speed.

Although not shown, in the case of performing adjustment operation such that the second distance L2 is shorter than the first distance L1, the amount of movement T2 of the second slider 15 in the Y-axis direction is smaller than the amount of movement T1 of the first slider 32 in the Y-axis direction.

Accordingly, an orientation of the optical axis A of the optical module 10 can be adjusted with high resolution. In this manner, in the first embodiment, the switch unit 40 transfers the second driving force by the second driving unit 44 to the first rotation shaft 41 and switches to one of a first state where the second distance L2 is longer than the first distance L1 or a second state where the second distance L2 is shorter than the first distance L1. Thus, resolution of the amount of movement T2 of the second slider 15 can be switched.

In performing adjustment operation, the switch unit 40 may move not only the first rotation shaft 41 but also the adjustment unit 30 in the Z-axis direction with respect to the fixing member 20. In this case, movement of the first projection 32a in the Z-axis direction changes the first distance L1, and thus, similar advantages can be obtained. The switch unit 40 may move the adjustment target module 35 in the Z-axis direction with respect to the fixing member 20. In this case, movement of the second projection 15a in the Z-axis direction changes the second distance L2, and thus, similar advantages can be obtained.

In addition, the switch unit 40 may be configured to move a combination of all or any two components of the link member 42, the adjustment unit 30, and the adjustment target module 35 in the Z-axis direction. In this case, a relative distance of the second distance L2 to the first distance L1 changes, and thus, similar advantages can be obtained. That is, it is sufficient that in changing at least one of the first distance L1 or the second distance L2, at least one of the first rotation shaft 41, the first projection 32a, or the second projection 15a is a movable unit that is moved by the switch unit 40.

Advantages of First Embodiment

As described above, in the gear shift adjusting mechanism 1 according to the first embodiment, the switch unit 40 moves the first rotation shaft 41 as a movable unit in the Z-axis direction so that at least one of the first distance L1 between the first rotation shaft 41 and the first projection 32a or the second distance L2 between the first rotation shaft 41 and the second projection 15a is changed. In this manner, the driving deceleration ratio T2/T1 can be switched.

In the first embodiment, the gear shift adjusting mechanism 1 is included in the headlight device 100. Thus, an orientation of the optical axis A of the optical module 10 can be adjusted at high speed by making the amount of movement T2 of the second slider 15 in the Y-axis direction larger than the amount of movement T1 of the first slider 32 in the Y-axis direction. The orientation of the optical module 10 can be adjusted with high resolution by making the amount of movement T2 of the second slider 15 in the Y-axis direction smaller than the amount of movement T1 of the first slider 32 in the Y-axis direction.

In the first embodiment, the headlight device 100 can adjust the optical axis A so that light B does not enter the driver of an oncoming car.

Second Embodiment

Figure 11:
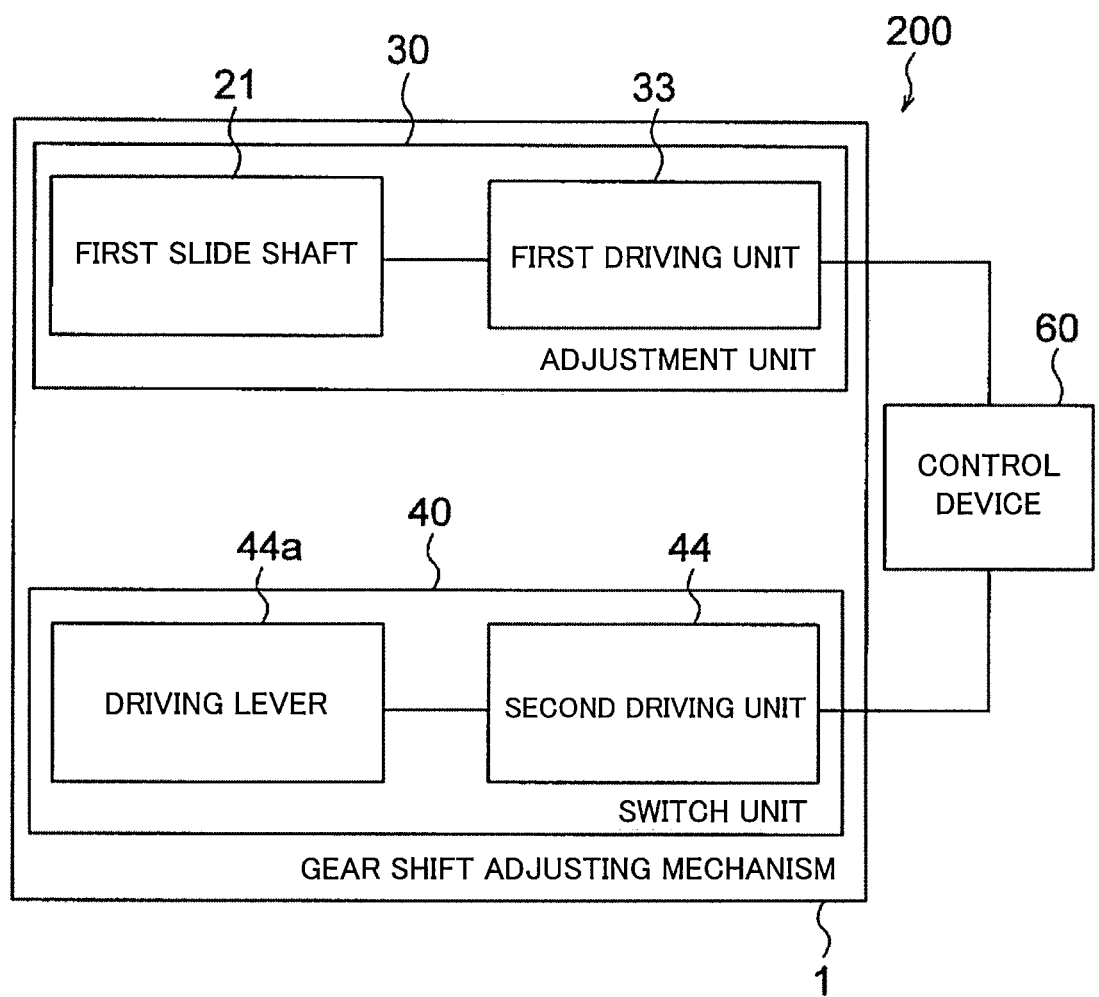
FIG. 11 is a block diagram illustrating a configuration of a headlight device according a second embodiment.

FIG. 11 is a block diagram illustrating a configuration of a headlight device 200 according a second embodiment. The headlight device 200 according to the second embodiment is different from the headlight device 100 according to the first embodiment in further including a control device 60. Regarding the other aspects, the headlight device 200 according to the second embodiment is the same as the headlight device 100 according to the first embodiment. Thus, the following description will be made with reference to FIGS. 1 and 2, for example.

The headlight device 200 includes a gear shift adjusting mechanism 1, an optical module 10 (see FIG. 1), and the control device 60. The control device 60 drives a first driving unit 33 and a second driving unit 44.

Operation of the headlight device 200 before adjustment operation of a driving deceleration ratio is similar to the first embodiment, and thus, will not be described here. In the case of performing adjustment operation, a ratio L2/L1 of a second distance L2 to a first distance L1 shown in FIG. 7 is changed also in the second embodiment.

Figure 12:
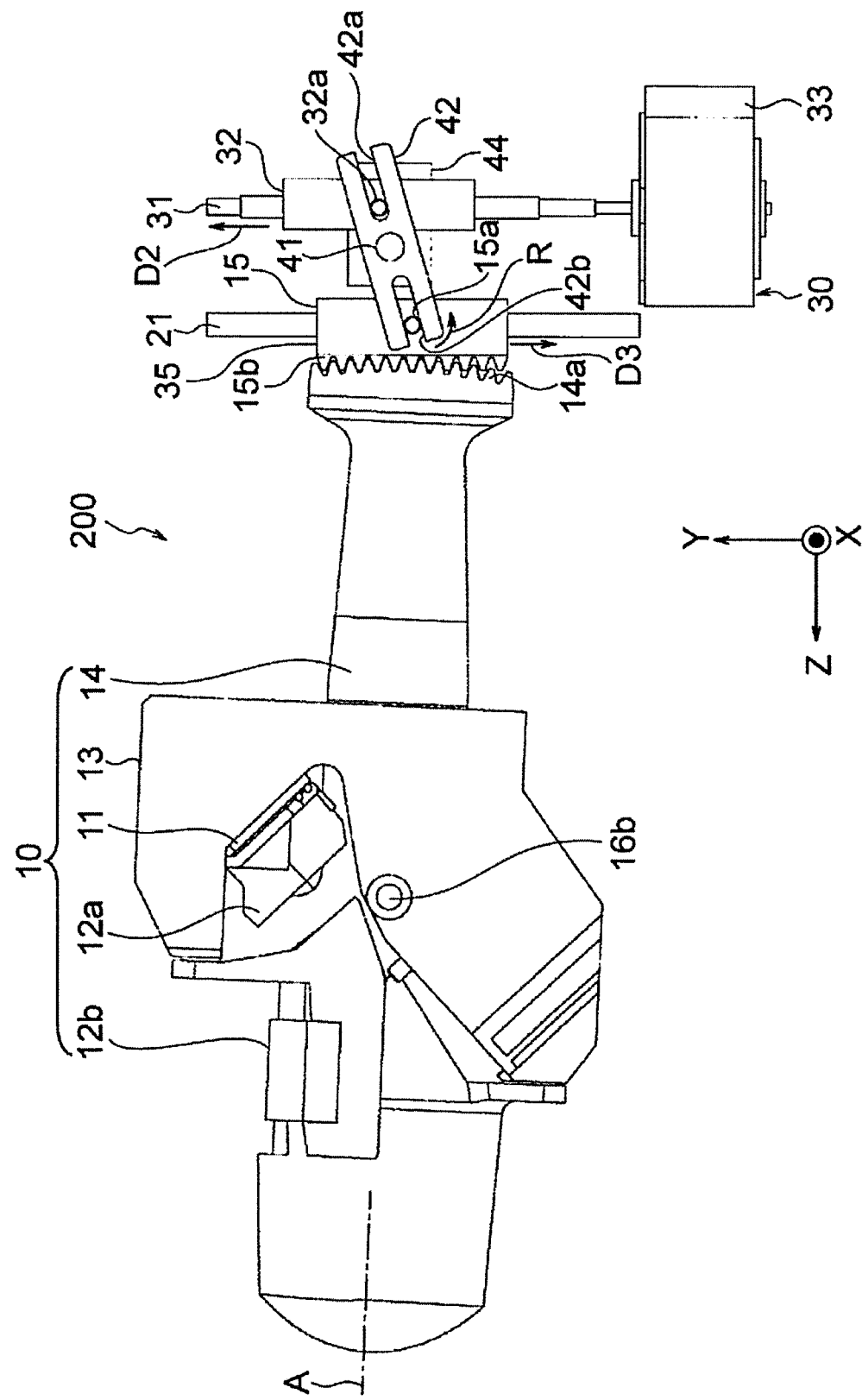
FIG. 12 is a side view illustrating the structure of the headlight device when a second driving unit illustrated in FIG. 11 is driven.

FIG. 12 is a side view illustrating a structure of the headlight device 200 when the second driving unit 44 illustrated in FIG. 11 is driven. In the second embodiment, in the case of performing adjustment operation, the control device 60 drives the first driving unit 33 in synchronization with the second driving unit 44 so that a first rotation shaft 41, a first projection 32a, and a second projection 15a are located on the same straight line when seen in the axial direction. That is, in the second embodiment, in the adjustment operation, the first driving unit 33 and the second driving unit 44 are driven at the same time by the control device 60. Accordingly, a first rotation shaft 41 and a link member 42 can be moved in the Z-axis direction by driving the second driving unit 44, and the first slider 32 can be moved in the Y-axis direction by driving the first driving unit 33. At this time, the control device 60 drives the first driving unit 33 and the second driving unit 44 so that the second slider 15 does not move in the Y-axis direction. Accordingly, the position of a second projection 15a in the Y-axis direction does not change before and after the adjustment operation.

Figure 13:
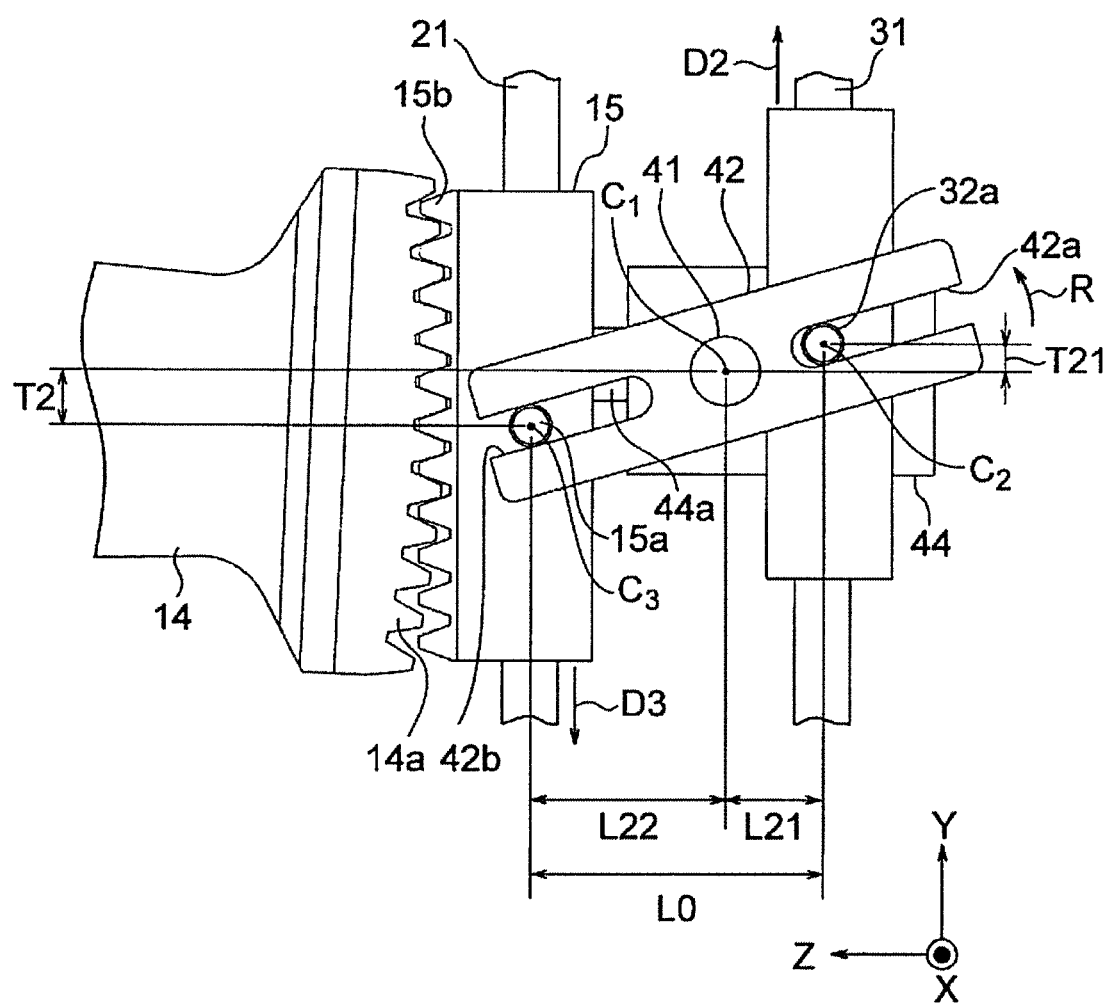
FIG. 13 is an enlarged side view illustrating a structure around a link member illustrated in FIG. 12.

FIG. 13 is an enlarged side view illustrating a structure around the link member 42 illustrated in FIG. 12. In FIG. 13, suppose a first distance between a shaft center $C_1$ of the first rotation shaft 41 and a center $C_2$ of the first projection 32a when the second driving unit 44 is driven is L21, and a second distance between the shaft center $C_1$ and a center $C_3$ of the second projection 15a when the second driving unit 44 is driven is L22. In FIG. 13, the amount of movement of the first slider 32 in the Y-axis direction when the second driving unit 44 is driven is T21, and the amount of movement of the second slider 15 in the Y-axis direction when the second driving unit 44 is T2. As described above, in the second embodiment, the position of the second projection 15a in the Y-axis direction does not change before and after adjustment operation. In other words, in the second embodiment, the amount of movement of the second slider 15 in the Y-axis direction is unchanged at the amount of movement T2 before and after driving of the second driving unit 44.

In this embodiment, a driving deceleration ratio T2/T21 that is a ratio of the amount of movement T2 of the second slider 15 in the Y-axis direction to the amount of movement T21 of the first slider 32 in the Y-axis direction and a ratio L22/L21 of the second distance L22 to the first distance L21 satisfy Equation (2):

$$T2/T21 = L22/L21 \quad (2)$$

In FIG. 13, suppose a total distance of the distance L21 and the distance L22, that is, the distance between the center O2 and the center Cs, is L0, the total distance L0, the distance L21, and the distance L22 satisfy Equation (3):

$$L22 = L0 - L21 \quad (3)$$

When Equation (3) is substituted into Equation (2), Equation (4) is derived.

$$T2 = 121((L0-L21)/L1) \quad (4)$$

The control device 60 interlocks driving of the first driving unit 33 and driving of the second driving unit 44 so as to satisfy Equation (4). Accordingly, the position of the second projection 15a in the Y-axis direction does not change before and after adjustment operation, and thus, an orientation of the optical axis A of the optical module 10 does not change. In this manner, in the second embodiment, the driving deceleration ratio T2/T21 can be switched without a change of the orientation of the optical axis A of the optical module 10.

In the example illustrated in FIG. 13, since the second distance L22 is longer than the first distance L21 after adjustment operation, the amount of movement T2 of the second slider 15 in the Y-axis direction is larger than the amount of movement T21 of the first slider 32 in the Y-axis direction. In the second embodiment, for the adjustment operation, the switch unit 40 is not limited to the configuration in which the first rotation shaft 41 is moved in the Z-axis direction and may employ a configuration in which at least one of the first rotation shaft 41, the first projection 32a, or the second projection 15a is moved in the Z-axis direction.

Advantages of Second Embodiment

In the second embodiment described above, the gear shift adjusting mechanism 1 is included in the headlight device 200. Thus, an orientation of the optical axis A of the optical module 10 can be adjusted at high speed by making the amount of movement T2 of the second slider 15 in the Y-axis direction larger than the amount of movement T21 of the first slider 32 in the Y-axis direction. The orientation of the optical axis A of the optical module 10 can be adjusted with high resolution by making the amount of movement T2 of the second slider 15 in the Y-axis direction smaller than the amount of movement T21 of the first slider 32 in the Y-axis direction.

In the second embodiment, the control device 60 drives the first driving unit 33 in synchronization with the second driving unit 44 so that the first rotation shaft 41, the first projection 32a, and the second projection 15a are located on the same straight line when seen in the axial direction. Specifically, in the case of performing adjustment operation, the first driving unit 33 and the second driving unit 44 are driven at the same time. Accordingly, the amount of movement T2 of the second slider 15 in the Y-axis direction can be kept unchanged before and after the adjustment operation. As a result, the driving deceleration ratio T2/T21 can be adjusted without a change of orientation of the optical axis A of the optical module 10.

Variation of Second Embodiment

Figure 14:
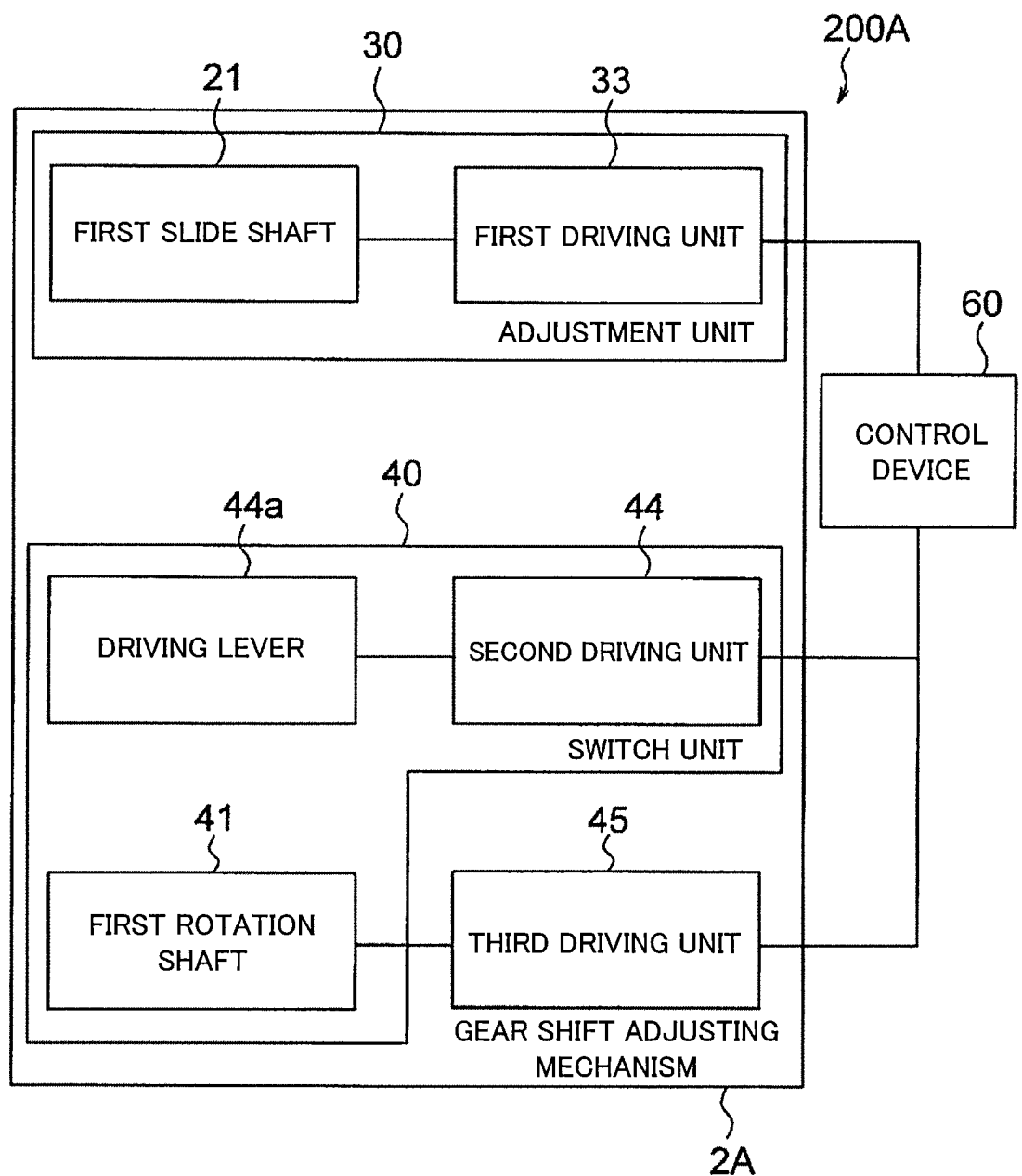
FIG. 14 is a block diagram illustrating a configuration of a headlight device according a variation of the second embodiment.

FIG. 14 is a block diagram illustrating a configuration of a headlight device 200A according a variation of the second embodiment. In FIG. 14, the same reference characters as those in FIG. 11 designate the same or corresponding components as those illustrated in FIG. 11. The headlight device 200A according to the variation of the second embodiment is different from the headlight device 200 according to the second embodiment in that a gear shift adjusting mechanism 2A further includes a third driving unit 45. Regarding the other aspects, the headlight device 200A according to the variation of the second embodiment is the same as the headlight device 200 according to the second embodiment.

The headlight device 200A includes the gear shift adjusting mechanism 2A, an optical module 10 (see FIG. 1), and a control device 60. The gear shift adjusting mechanism 2A includes an adjustment unit 30, a switch unit 40, and the third driving unit 45. The third driving unit 45 generates a third driving force that moves a first rotation shaft 41 in a direction perpendicular to the first rotation shaft 41 and parallel to a first slide shaft 31 and a second slide shaft 21 (i.e., Y-axis direction).

The control device 60 drives a first driving unit 33, a second driving unit 44, and the third driving unit 45. Specifically, the control device 60 drives the third driving unit 45 in synchronization with the first driving unit 33 and the second driving unit 44 so that the first rotation shaft 41, the first projection 32a, and the second projection 15a are located on the same straight line when seen in the axial direction. For example, in a manner similar to the second embodiment, the control device 60 interlocks driving of the first driving unit 33, driving of the second driving unit 44, and driving of the third driving unit 45 so as to satisfy Equation (4) described above. Accordingly, the amount of movement T2 of the second slider 15 in the Y-axis direction (see FIG. 13) can be kept unchanged before and after the adjustment operation. As a result, the driving deceleration ratio can be adjusted without a change of orientation of the optical axis A of the optical module 10.

Advantages of Variation of Second Embodiment

In the variation of the second embodiment described above, the gear shift adjusting mechanism 2A further includes the third driving unit 45 that moves the first rotation shaft 41 in the Y-axis direction. The control device 60 drives the third driving unit 45 in synchronization with the first driving unit 33 and the second driving unit 44 so that the first rotation shaft 41, the first projection 32a, and the second projection 15a are located on the same straight line when seen in the axial direction. Accordingly, the amount of movement T2 of the second slider 15 in the Y-axis direction can be kept unchanged before and after the adjustment operation. As a result, the driving deceleration ratio can be adjusted without a change of orientation of the optical axis A of the optical module 10.

Third Embodiment

Figure 15:
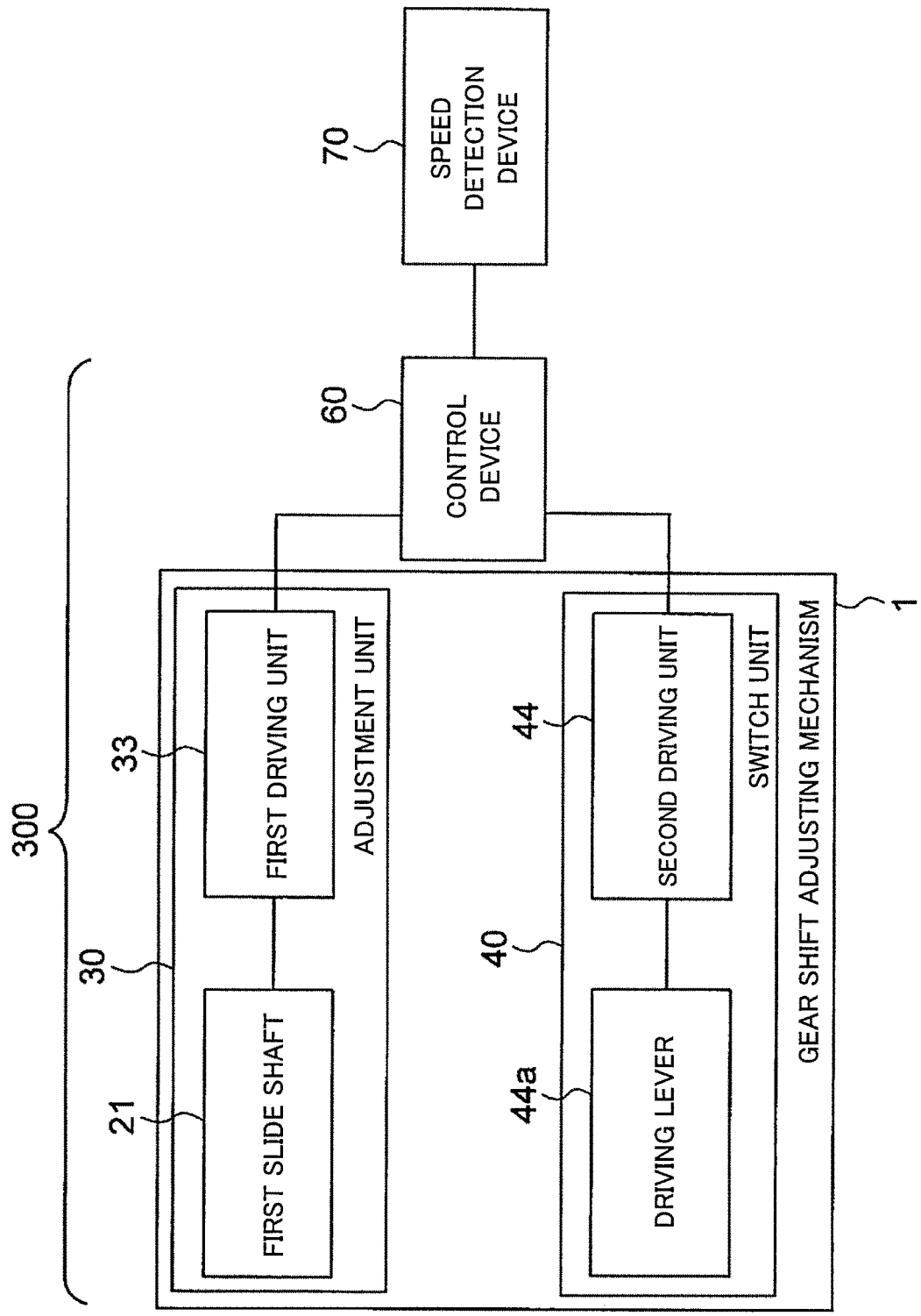
FIG. 15 is a block diagram illustrating a configuration of a headlight device according a third embodiment.

FIG. 15 is a block diagram illustrating a configuration of a headlight device 300 according a third embodiment. In FIG. 15, the same reference characters as those in FIG. 11 designate the same or corresponding components as those illustrated in FIG. 11. The headlight device 300 according to the third embodiment is different from the headlight device 100 according to the first embodiment in further including a control device 60 connected to a speed detection device 70. Regarding the other aspects, the headlight device 300 according to the third embodiment is the same as the headlight device 100 according to the first embodiment.

The headlight device 300 includes a gear shift adjusting mechanism 1, an optical module 10 (see FIG. 1), and the control device 60 connected to the speed detection device 70. The speed detection device 70 is included in, for example, a vehicle equipped with the headlight device 300, and detects a speed of the vehicle in the traveling direction. The speed detection device 70 may be included in the headlight device 300.

Operation of the headlight device 300 before adjustment operation is similar to the first embodiment, and thus, will not be described here. In the third embodiment, before adjustment operation, the control device 60 drives a first driving unit 33 and a second driving unit 44 based on vehicle speed information detected by the speed detection device 70.

Specifically, if a vehicle speed detected by the speed detection device 70 is less than or equal to a predetermined threshold (i.e., when the vehicle is decelerated or stopped), the control device 60 moves the second driving unit 44 in the +Z-axis direction so that the second distance L2 illustrated in FIG. 7 is shorter than the first distance L1. Accordingly, the amount of movement T2 of the second slider 15 in the Y-axis direction illustrated in FIG. 7 is smaller than the amount of movement T1 of the first slider 32 in the Y-axis direction. Thus, while the vehicle is decelerated or stopped, an orientation of an optical axis A of an optical module 10 can be adjusted with high resolution.

If the vehicle speed exceeds the threshold (i.e., if the vehicle is accelerated), the control device 60 moves the second driving unit 44 in the −Z-axis direction so that the second distance L2 illustrated in FIG. 7 is larger than the first distance L1. Accordingly, the amount of movement T2 of the second slider 15 in the Y-axis direction illustrated in FIG. 7 is larger than the amount of movement T1 of the first slider 32 in the Y-axis direction. Thus, the orientation of the optical axis A of the optical module 10 can be adjusted at high speed with respect to a variation of a tilt of the vehicle body occurring when the vehicle is accelerated.

The control device 60 may enhance resolution for the orientation of the optical axis A of the optical module 10 by driving the second driving unit 44 so that the second distance L2 illustrated in FIG. 7 is shorter than the first distance L1, after the orientation of the optical axis A of the optical module 10 is coarsely adjusted at high speed while the vehicle is accelerated. Accordingly, the headlight device 300 can perform adjustment in two stages: a stage of coarsely adjusting the orientation of the optical axis A of the optical module 10; and a stage of finely adjusting the orientation. Thus, the functions of the headlight device 300 can be advanced.

Advantages of Third Embodiment

In the headlight device 300 according to the third embodiment described above, when the vehicle speed detected by the speed detection device 70 is less than or equal to the predetermined threshold, the switch unit 40 makes the second distance L2 illustrated in FIG. 7 shorter than the first distance L1. Accordingly, while the vehicle is decelerated or stopped, the amount of movement T2 of the second slider 15 in the Y-axis direction is smaller than the amount of movement T1 of the first slider 32 in the Y-axis direction, and thus, the orientation of the optical axis A of the optical module 10 can be adjusted with high resolution.

In the headlight device 300 according to the third embodiment, if the vehicle speed detected by the speed detection device 70 exceeds the threshold, the switch unit 40 makes the second distance L2 illustrated in FIG. 7 longer than the first distance L1. Accordingly, while the vehicle is accelerated, the amount of movement T2 of the second slider 15 in the Y-axis direction is larger than the amount of movement T1 of the first slider 32 in the Y-axis direction, and thus, the orientation of the optical axis A of the optical module 10 can be adjusted at high speed.

DESCRIPTION OF REFERENCE CHARACTERS 1, 2A gear shift adjusting mechanism, 10 optical module, 11 light source, 12a, 12b optical member, 13 holding member, 14 coupling member, 14a engaging part, 15 second slider, 15a second projection, 15b engaged part, 16, 16a, 16b second rotation shaft, 20 fixing member, 20a first slide guide groove, 20b second slide guide groove, 20c third slide guide groove, 21 second slide shaft, 30 adjustment unit, 31 first slide shaft, 32 first slider, 32a first projection, 33. first driving unit, 35 adjustment target module, 40 switch unit, 41 first rotation shaft, 42 link member, 42a first cam groove, 42b second cam groove, 42c bearing portion, 43 coupling lever, 44 second driving unit, 44a driving lever, 60 control device, 70 speed detection device, 100, 200, 200A, 300 headlight device, A optical axis.

What is claimed is:

1. A gear shift adjusting mechanism comprising:
an adjustment unit supported by a fixing member and including a first slider movable along a first slide shaft;
an adjustment target module supported by the fixing member and including a second slider movable along a second slide shaft, the second slide shaft being parallel to the first slide shaft; and
a switch unit supported by the fixing member and including a first rotation shaft and a link member, the first rotation shaft being perpendicular to the first slide shaft and perpendicular to a line connecting the first slide shaft and the second slide shaft to each other, the link member being supported rotatably with respect to the fixing member about the first rotation shaft, wherein
the first slider includes a first engaging part,
the second slider includes a second engaging part,
the link member includes a first engaged part that is engaged with the first engaging part, and a second engaged part that is engaged with the second engaging part, and
the switch unit moves a movable unit that is at least one of the first rotation shaft, the first engaging part, or the second engaging part so that at least one of a first distance between the first rotation shaft and the first engaging part or a second distance between the first rotation shaft and the second engaging part is changed.

2. The gear shift adjusting mechanism according to claim 1, wherein the switch unit moves the movable unit in a direction orthogonal to the first rotation shaft, the first slide shaft, and the second slide shaft.

3. The gear shift adjusting mechanism according to claim 1, wherein when seen in an axial direction that is a direction in which the first rotation shaft extends, the first rotation shaft, the first engaging part, and the second engaging part are located on an identical straight line.

4. The gear shift adjusting mechanism according to claim 1, wherein the first engaged part is disposed opposite to the second engaged part with the first rotation shaft in between.

5. The gear shift adjusting mechanism according to claim 1, wherein
the first engaged part is a first cam groove,
the second engaged part is a second cam groove,
the first engaging part is a first projection that is engaged with the first cam groove, and
the second engaging part is a second projection that is engaged with the second cam groove.

6. The gear shift adjusting mechanism according to claim 5, wherein each of the first cam groove and the second cam groove is a long groove elongated in a direction in which a line connecting the first rotation shaft, the first projection, and the second projection extends.

7. The gear shift adjusting mechanism according to claim 6, wherein the first cam groove and the second cam groove extend in a direction parallel with the straight line.

8. The gear shift adjusting mechanism according to claim 1, wherein the adjustment unit further includes a first driving unit that generates a first driving force for moving the first slider.

9. The gear shift adjusting mechanism according to claim 8, wherein the switch unit further includes a second driving unit that generates a second driving force for moving the movable unit.

10. The gear shift adjusting mechanism according to claim 9, wherein the switch unit transfers the second driving force to the movable unit, and switches to one of a first state where the second distance is longer than the first distance or a second state where the second distance is shorter than the first distance.

11. A headlight device comprising:
the gear shift adjusting mechanism according to claim 10 and
an optical module coupled to the adjustment target module.

12. The headlight device according to claim 11, further comprising a control device that drives the first driving unit in synchronization with the second driving unit so that the first rotation shaft, the first engaging part, and the second engaging part are located on an identical straight line.

13. The headlight device according to claim 12, wherein
the gear shift adjusting mechanism further includes a third driving unit that moves the first rotation shaft in a direction orthogonal to the first rotation shaft, and the control device drives the third driving unit in synchronization with the first driving unit and the second driving unit.

14. The headlight device according to claim 11, wherein the optical module is supported rotatably with respect to the fixing member about a second rotation shaft.

15. The headlight device according to claim 11, wherein the optical module includes a light source that emits light, and an optical member that changes a light distribution pattern of the light emitted from the light source.

16. The headlight device according to claim 11, wherein
the headlight device is a headlight device for a vehicle including a speed detection device, and
the switch unit makes the second distance shorter than the first distance if a vehicle speed detected by the speed detection device is less than or equal to a predetermined threshold, and makes the second distance longer than the first distance if the vehicle speed detected by the speed detection device exceeds the predetermined threshold.

* * * * *